(No Model.)
C. G. BIEDINGER.
BOTTLE WRAPPER.
No. 411,371. Patented Sept. 17, 1889.
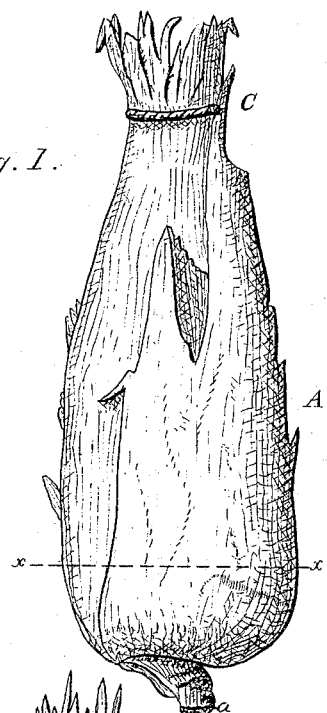
Fig. 1.
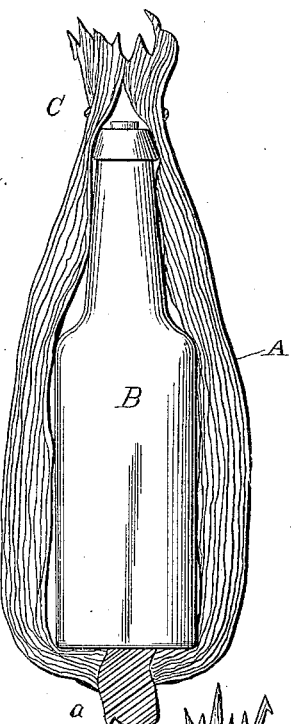
Fig. 2.
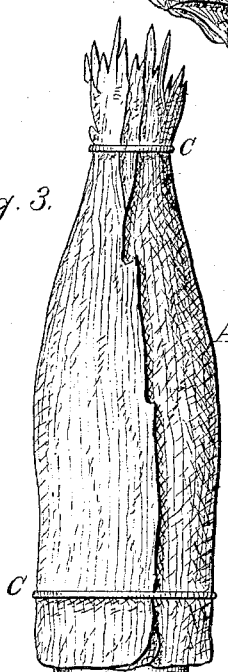
Fig. 3.
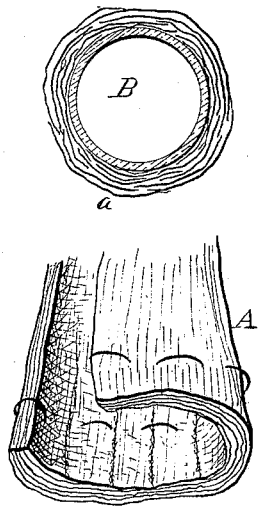
Fig. 5.
Fig. 6.
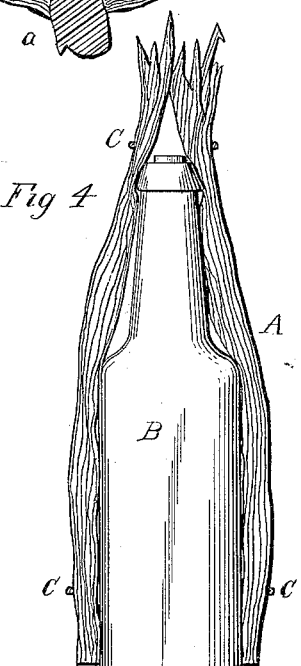
Fig. 4.
Witnesses
Norris A. Clark.
Arthur N. Ord.
Inventor
Charles G. Biedinger
By his Attorneys
Whitney & Wright,

UNITED STATES PATENT OFFICE.

CHARLES GEORGE BIEDINGER, OF CINCINNATI, OHIO.

BOTTLE-WRAPPER.

SPECIFICATION forming part of Letters Patent No. 411,371, dated September 17, 1889.

Application filed September 6, 1888. Serial No. 284,758. (No model.)

*To all whom it may concern:*

Be it known that I, CHARLES GEORGE BIEDINGER, a citizen of the United States, residing at Cincinnati, in the county of Hamilton and State of Ohio, have invented certain new and useful Improvements in Bottle-Wrappers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to wrappers for packing bottles, and its object is to utilize for this purpose a material not heretofore so employed, one which is cheap and plentiful and commonly regarded as a waste product.

The invention consists in bottle-wrappers made from the husk of Indian corn, as hereinafter described and claimed.

I have discovered that a corn-husk in its natural state—*i. e.*, with its spathes disposed in their natural arrangement—makes an excellent bottle-wrapper, since it conforms to the shape of the bottle, is elastic by reason of its natural corrugations and convolutions, and is also light, clean, and inexpensive.

In the drawings, Figure 1 is a view of one form of wrapper. Fig. 2 is a vertical section of the same disclosing the bottle. Fig. 3 is a view of another form of wrapper. Fig. 4 is a vertical section thereof. Fig. 5 is a cross-section, and Fig. 6 shows another modification.

The same letters refer to the same parts in all the figures.

The wrapper shown in Figs. 1 and 2 consists of the complete husk A of an ear of corn, the ear itself having been taken out, leaving the layers of husk (or spathes) substantially undisturbed and united to the stem *a* at the butt. The bottle B is inserted by parting the spathes at the top and sliding the bottle down into the husk, bottom first. The spathes are then gathered together around the neck of the bottle, and may be confined by a suitable band C, of twine, rubber, or the like.

The wrapper shown in Figs. 3 and 4 is made by cutting around the base of the husk A with a sharp knife, along the line *x x*, Fig. 1, and high enough above the butt of the ear to allow it to be easily withdrawn, leaving the spathes substantially undisturbed. Before cutting the spathes should be secured against accidental separation by taking a few stitches through them with a thread, string, or wire. The bottle is inserted into the wrapper from the open larger end. The layers of husk may be retained in place upon the bottle by bands C, as in the other form.

In the form shown in Fig. 6 the spathes are held together by stitches *c*, of thread or wire, inserted, preferably, before the husk is severed and the ear withdrawn. Stitches may be substituted for the bands shown in Figs. 1 and 3, if desired, or the bands and other retaining devices may be omitted entirely.

The bottles to be protected are enveloped in these wrappers, each bottle being preferably inclosed in the complete or nearly complete husk of a single ear of corn; but if some of the wrappers are too small to be used in this way they can be slit open longitudinally, as shown in Fig. 6, and the bottle enveloped in two or more of them, each being wrapped as far around the bottle as it will go. The bottles can then be packed in any kind of a shipping-case for transportation.

The fine longitudinal corrugations or wrinkles in the husk, formed by the natural veining of the spathes and the natural folds or convolutions of the husk, render it elastic and yielding, so as to effectually cushion the bottles, allowing them to be packed closely enough to prevent their rolling about, and yet not so tightly as to endanger them. The husks contain so much material that it is not necessary for each bottle to be completely enveloped in its wrapper, provided the bottles are so packed as not to bring the unprotected portions of adjacent bottles in juxtaposition.

The husks are clean and make no dust or litter. They are so light as to add but little to the weight of the package. Any farmer can easily make these bottle-wrappers, and so turn to good account an article that he is now accustomed to throw away. The wrappers can be flattened down for shipment to the bottle-packers, by whom they can be opened out for use as wanted.

Having thus described my invention, what

I claim, and desire to secure by Letters Patent, is—

1. A bottle-wrapper consisting of the husk of an ear of corn having its spathes substantially undisturbed, as and for the purpose set forth.

2. A bottle-wrapper consisting of the husk of an ear of corn having its spathes substantially undisturbed, and provided with devices for retaining them in place, as and for the purpose set forth.

In testimony whereof I affix my signature in presence of two witnesses.

CHARLES GEORGE BIEDINGER.

Witnesses:
SAML. S. CARPENTER,
PAUL CARPENTER.